United States Patent
Yegnanarayanan et al.

(10) Patent No.: US 7,133,586 B2
(45) Date of Patent: Nov. 7, 2006

(54) METHOD TO REALIZE FAST SILICON-ON-INSULATOR (SOI) OPTICAL DEVICE

(75) Inventors: Sivasubramaniam Yegnanarayanan, Oak Park, CA (US); Mikhail Naydenkov, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/411,059

(22) Filed: Apr. 25, 2006

(65) Prior Publication Data

US 2006/0198572 A1  Sep. 7, 2006

Related U.S. Application Data

(63) Continuation of application No. 10/061,981, filed on Jan. 31, 2002.

(51) Int. Cl.
G02B 6/12 (2006.01)
(52) U.S. Cl. .......................................... 385/14; 385/24
(58) Field of Classification Search ................ 385/14, 385/24
See application file for complete search history.

(56) References Cited

U.S. PATENT DOCUMENTS

| | | | |
|---|---|---|---|
| 4,789,642 A | 12/1988 | Lorenzo et al. | |
| 4,963,509 A | 10/1990 | Yoshizawa et al. | |
| 5,026,135 A * | 6/1991 | Booth | 385/130 |
| 5,168,541 A * | 12/1992 | Booth | 385/129 |
| 5,677,562 A | 10/1997 | Korwin-Pawlowski et al. | |
| 5,787,214 A | 7/1998 | Harpin et al. | |
| 5,838,870 A | 11/1998 | Soref | |
| 5,851,857 A | 12/1998 | Kelberlau et al. | |
| 5,886,670 A | 3/1999 | Manasson et al. | |
| 6,233,070 B1 | 5/2001 | Lu et al. | |

(Continued)

FOREIGN PATENT DOCUMENTS

WO   WO 95/08787   3/1995

(Continued)

OTHER PUBLICATIONS

Veron, A. et al., "Spin-on Dopants as Lifetime Modifier Sources in Fast Recovery Epitaxial Diodes Processing", IEEE, 1997, pp. 225-228.

(Continued)

Primary Examiner—Ellen E. Kim
(74) Attorney, Agent, or Firm—Blakely, Sokoloff, Taylor & Zafman LLP

(57) ABSTRACT

A fast silicon-on-insulator (SOI) waveguide-based optical device enhanced with minority charge carrier lifetime modifiers enables faster modulation speeds in optical attenuators, optical intensity/phase-modulators, and optical switches whose operation principles are based on free-carrier injection into a waveguide. The waveguide is doped with gold (Au) or platinum (Pt) such that when a drive voltage (applied to the device) is turned off, the minority charge carriers rapidly annihilate because gold doping reduces the minority carrier lifetime, which improves transient characteristics of the optical device. Integration of the fast active device with passive devices such as WDM demultiplexers/multiplexers on the SOI optical waveguide platform enables realization of monolithic integrated optical components for advanced functionality such as dynamic spectral equalization.

13 Claims, 6 Drawing Sheets

U.S. PATENT DOCUMENTS

| | | |
|---|---|---|
| 6,285,477 B1 | 9/2001 | Miyazaki et al. |
| 6,298,177 B1 | 10/2001 | House |
| 6,323,994 B1 | 11/2001 | Li et al. |
| 6,327,396 B1 | 12/2001 | Harpin |
| 6,473,540 B1 | 10/2002 | Augustsson |
| 6,963,118 B1 * | 11/2005 | Deliwala et al. ............ 257/428 |
| 2001/0050793 A1 | 12/2001 | Harpin et al. |
| 2002/0015155 A1 | 2/2002 | Pechstedt et al. |
| 2002/0126976 A1 | 9/2002 | Day |
| 2003/0007763 A1 | 1/2003 | Bazylenko et al. |
| 2003/0057522 A1 | 3/2003 | Francis et al. |
| 2003/0185534 A1 * | 10/2003 | Kaneko et al. ............ 385/129 |
| 2004/0081398 A1 | 4/2004 | Jette et al. |

OTHER PUBLICATIONS

Zhao, C.Z. et al., "Silicon-on-Insulator Optical Intenisty Modulator Based on Waveguide-Vanishing Effect", Electronic Letters, vol. 32, No. 18, Aug. 29, 1996, pp. 1667-1668.

Liu, Y.L. et al., "Silicon 1×2 Digital Optical Switch Using Plasma Dispersion", Electronic Letters, vol. 30, No. 2, Jan. 20, 1994, pp. 130-131.

Iliescu, E. et al., "Fast Silicon Diodes Obtained by Electron Beams", Proceedings of the 12th International Conference on High-Power Particle Beams, 1998, vol. 2, pp. 989-992.

* cited by examiner

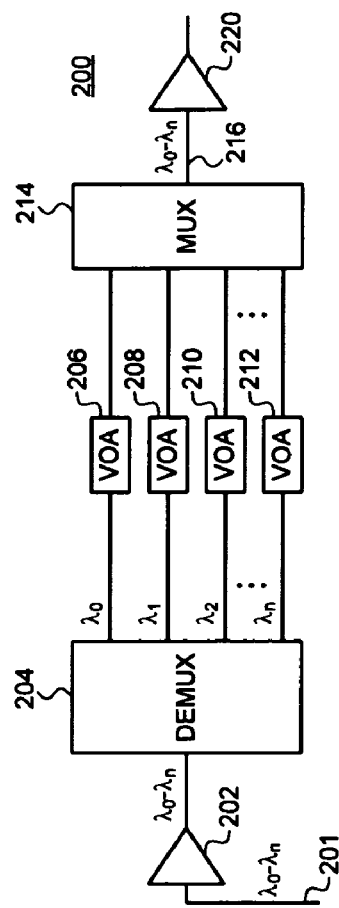
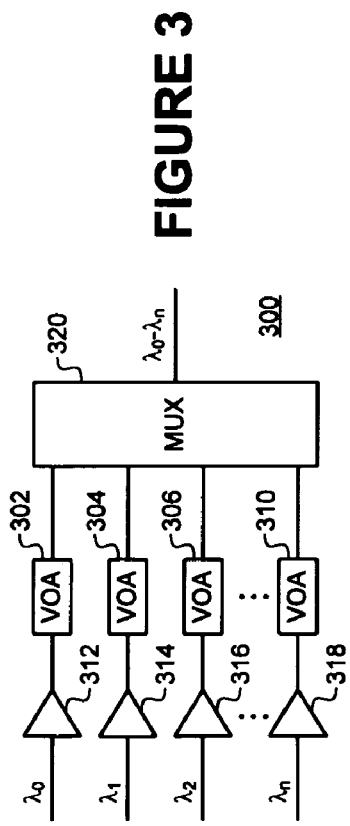

METHOD TO REALIZE FAST SILICON-ON-INSULATOR (SOI) OPTICAL DEVICE

CROSS-REFERENCE TO RELATED APPLICATIONS

This application is a Continuation of U.S. application Ser. No. 10/061,981, filed Jan. 31, 2002.

BACKGROUND OF THE INVENTION

1. Field of the Invention

The present invention is related to photonic devices and, in particular to integrated optical circuits.

2. Background Information

Silicon, as an electronic material, is widely used to realize electronic integrated circuits. Over ninety percent of integrated circuits fabricated worldwide use silicon as the starting material. It is well known that the highest operational frequency a silicon based electrical semiconductor device may have is limited by the speed at which the device switches. The switching speed of a bipolar semiconductor device is related to the "minority carrier life times" in the active area of the silicon crystals that makes the device work. A minority carrier is one whose equilibrium concentration (in silicon) is less than the majority carrier. For example, in N-type silicon, holes are the minority carriers and in P-type silicon, electrons are the minority carriers. The minority carrier lifetime is the average time interval between the generation and recombination of a minority carrier The minority carrier lifetime can have a pronounced effect on the operation of a P-N junction semiconductor device because the minority carrier lifetime determines the switching response time. By introducing more recombination centers, the rate of recombination process increases. This allows the annihilation of generated/injected minority carriers within a shorter period of time, which increases the switching speed.

The number of recombination centers (or "trap centers") in a semiconductor (e.g., silicon) is partially dependent on the presence of impurities creating energy levels inside the energy band gap. The efficiency of trap centers is characterized by capture cross-section and carriers capture rate. The most efficient traps are those having their energy levels close to the middle of band gap. Such recombination centers are called deep level recombination centers or traps.

In the mainstream silicon semiconductor industry, minority carrier lifetime modifiers for silicon are gold and platinum impurities and surface defects caused by high-energy electron irradiation. Impurities could be introduced into semiconductor by either diffusion on ion implantation.

Technologies currently exist that allow transporting of electronic data in optical form from a data source to data destination over a long distance without intermediate optical-electrical conversion. As more technologies emerge and current technologies mature, several functions previously performed in the electrical domain are migrating into optical domain functionalities.

Photonic integrated circuit fabrication technologies also are emerging and maturing. For example, among the several different planar waveguide platforms such as silica-on-silicon, lithium niobate ($LiNbO_3$), gallium arsenide (GaAs), indium phosphide (InP), and polymer, silicon-on-insulator (SOI) is a promising substrate material for the realization of integrated optoelectronic devices, including both passive and active optical waveguide device structures.

An advantage of SOI planar waveguide platform is that the light-guiding medium is silicon, which is a semiconductor material offering very mature integrated circuit technology. Silicon is transparent in the long wavelength region (greater than 1.2 micron), which is of interest in fiber optic telecommunication. SOI already offers several benefits for scaling electronic device performance, by eliminating/reducing the substrate capacitance. In addition, with the commercially available 0.18 micron silicon complementary metal oxide semiconductor (Si CMOS) processes offered by foundry providers (e.g., TSMC in San Jose, Calif., and others), ten Gigabits per second (Gbps) lightwave circuits such as laser drivers and pre-amplifiers are possible. Furthermore, the ability to integrate germanium in silicon allows formation of long-wavelength (greater than 1.2 micron) photodetectors in silicon. Therefore, true integration of optical, electronic, and optoelectronic devices is possible on an SOI platform.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 1 is a perspective view of an optical device on an SOI platform according to embodiments of the present invention;

FIG. 2 is a schematic diagram of a dynamic gain equalizer according to embodiments of the present invention;

FIG. 3 is a schematic diagram of system according to embodiments of the present invention;

FIG. 4 is a perspective view of a Mach-Zehnder-based fast optical modulator/switch according to embodiments of the present invention;

FIG. 5 is a flow chart illustrating an approach to manufacturing the optical device in FIG. 1; and FIG. 6 is a flowchart illustrating an approach to operating an optical device according to embodiments of the present invention.

DETAILED DESCRIPTION OF THE ILLUSTRATED EMBODIMENTS

A fast optical device on an SOI platform is described in detail herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring embodiments of various embodiments of the invention.

Some parts of the description will be presented using terms such as waveguide, silicon, irradiation, doping, implantation, and so forth. These terms are commonly employed by those skilled in the art to convey the substance of their work to others skilled in the art.

Other parts of the description will be presented in terms of operations performed by a computer system, using terms such as accessing, determining, counting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
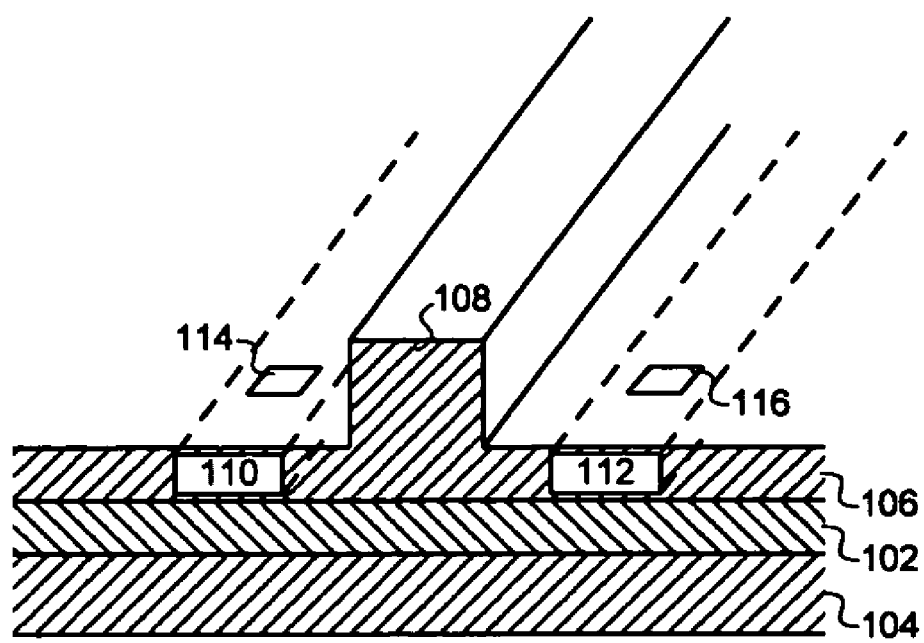

FIG. 1 is a perspective view of an optical device 100 according to embodiments of the present invention, which may be formed on an SOI platform having an insulator layer 102 of silicon dioxide (e.g., $SiO_2$, glass) formed on an intrinsic silicon (Si) layer 104 and a second intrinsic Si layer 106 formed on the insulator layer 102. Methods for fabricating a SOI platform are well known. For example, the insulator layer 102 may be grown on the two intrinsic Si layers 104 and 106. The intrinsic Si layers 104 and 106 can be bonded together using wafer fusion. The intrinsic Si layer 106 is subsequently thinned to the desired thickness, using chemical processes, for example. In this embodiment, the SOI platform is commonly referred to as a bond-and-etchback-silicon-on-insulator (BESOI) substrate.

Alternatively, oxygen may be implanted into an intrinsic Si layer at a well-defined depth (controlled by implant energy). The intrinsic Si layer may then be annealed to form the $SiO_2$ layer 102. In this embodiment, the SOI platform is commonly referred to as a separation by implanted oxygen (SIMOX) SOI substrate.

A waveguide 108 is formed in the intrinsic Si layer 106. The optical device 100 includes a region 110 doped with P-type material and a region 112 doped with N-type material, which forms a semiconductor diode. The P-doped region 110 may be in contact with an anode 114 and the N-doped region 112 may be in contact with a cathode 116. The waveguide 108 is doped with gold (Au) or platinum (Pt) atoms. Techniques for forming the waveguide 108 are well known. Techniques for doping the region 110 doped with P-type material and the region 112 doped with N-type material, as well as for doping the waveguide 108 with Au or Pt atoms include ion implantation, diffusion from spin-on solutions, or other current or future techniques.

In operation, when a positive potential is applied to the P-doped region 110 and a negative potential is applied to the N-doped region 112, the diode is forward biased. When the diode is forward biased and an optical signal is coupled into the waveguide 108, the P-doped region 110 and the N-doped region 112 inject free carriers into the intrinsic Si layer 106 and the waveguide 108, where optical mode propagates.

The refractive index perturbation due to free carrier dispersion effect is a complex number, with the real part of the complex value representing optical phase shift and the imaginary part representing the increase in optical propagation losses due to photon absorption by free charge carriers. The free carrier dispersion effect is described in a first order approximation by the following relations, which descend from the classical Drude model:

$$\Delta n = (e^2 \lambda^2 / 8\pi^2 c^2 \epsilon_0 n_0)[(b_e(\Delta N_e)^{1.05}/m_e^*) + (b_h(\Delta N_h)^{0.8}/m_h^*)]$$ (Equation 1)

$$\Delta \alpha = (e^3 \lambda^2 / 4\pi^2 c^3 \epsilon_0 n_0)[(b_e^*(\Delta N_e)^{1.05}/\mu_e m_e^{*2}) + (b_h^*(\Delta N_h)^{0.8}/\mu_h m_h^{*2})]$$ (Equation 2)

where $\Delta n$ and $\Delta \alpha$ represent real refractive index and the absorption coefficient variations, respectively, $n_0$ is the nominal index of refraction for intrinsic Si, e is the electronic charge, c is the speed of light, $\epsilon_0$ is the permittivity of free space, $\mu_e$ and $m_e^*$, and $\mu_h$ and $m_h^*$ are the electron and hole mobilities and effective masses, respectively, and $b_e$, $b_e^*$, $b_h$ and $b_h^*$ are fitting parameters.

The amount of phase shift ($\Phi$) caused by free charge carriers because of the free carrier plasma optical effect is given by:

$$\Phi = (2\pi/\lambda)(\Delta n L)$$ (Equation 3)

where $\Phi$ is the phase shift, $\lambda$ is the wavelength of the light, and L is the optical path along the free charge carrier region in the wavelength element 108.

Thus, to summarize, free carrier injection into intrinsic Si causes a change both in the real and the imaginary part of the refractive index of the intrinsic Si due to free carrier dispersion (or free carrier plasma) effect. The imaginary part of the refractive index increment causes change in optical absorption coefficient, while real part of the refractive index increment causes optical phase shift.

The addition of gold (platinum) impurities makes the removal of injected carriers from the waveguide 108 faster, after forward bias is turned off. Therefore, gold (platinum) doping of the waveguide provides for faster transition form "ON" state to "OFF" state of the device.

The optical device 100 may have several embodiments. According to one embodiment, the optical device 100 may be a fast variable optical attenuator, which attenuates an optical signal passing through it. FIG. 2 shows an example system 200 according to an embodiment of the present invention in which finer control of EDFA spectral gain equalization may be achieved using the optical device 100 as a variable optical attenuator, which equalizes optical energy distribution across multiple channels.

It is well known that optical signals coming from separate sources may have differing amplitudes. When optical signals from a number of channels are multiplexed together to provide a single multiplexed optical signal, the optical signals of different channels may exhibit the same or similar non-uniformity in amplitudes. Moreover, when the multiplexed optical signal is amplified using an optical amplifier, for example an erbium doped fiber amplifier (EDFA), the optical amplifier amplifies certain channels more than others as determined by the gain shape of the EDFA. Typically, an uncompensated EDFA has a gain shape that exhibits a strong gain peak at the 1530 nm wavelength and a variation of over five to ten dB in the gain at 1530 nm and 1560 nm. In typical terrestrial fiber optic links, optical channels traverse a cascade of several EDFAs, from source to destination. The cascade of EDFAs causes more pronounced gain imbalance by amplifying the EDFA gain shape with each successive pass through an amplifier. Hence, gain balancing or gain equalization over the wavelength spectrum range of interest may be performed at each EDFA.

Typically, in commercial EDFA devices, gain equalization or gain balancing is performed with passive filter devices such as long-period fiber gratings that are embedded within the gain block of the EDFA. The gratings have the inverse spectral response variation as the EDFA, thereby enabling the EDFA as a whole to exhibit flat wavelength response. However, such a system is not able to accommodate wavelength division multiplexing (WDM) channel spacing reductions from two hundred GHz down to one hundred GHz, as well as proposed fifty GHz and twenty-five GHz systems.

In the example system 200, an optical amplifier 202 (e.g., an EDFA) amplifies an incoming multiple channel optical signal (e.g., wavelengths $\lambda_0$–$\lambda_n$), a demultiplexer 204 (e.g., a WDM demultiplexer) separates the multiple channel optical signal ($\lambda_0$–$\lambda_n$) into n single channels (e.g., wavelengths $\lambda_0$, $\lambda_1$, $\lambda_1$, and $\lambda_n$) n variable optical attenuators (VOA) 206, 208, 210, and 212 adjust the gain of the n single channels (e.g., wavelengths $\lambda_0$, $\lambda_1$, $\lambda_1$, and $\lambda_n$), and a multiplexer 214 combines the adjusted n single channels (e.g., wavelengths $\lambda_0$, $\lambda_1$, $\lambda_1$, and $\lambda_n$), into an outgoing multiple channel optical signal ($\lambda_0$–$\lambda_n$) 216. Optionally, an optical amplifier 220 amplifies the outgoing multiple channel optical signal ($\lambda_0$–$\lambda_n$) 216.

According to an embodiment of the present invention, the attenuation of each VOA 206, 208, 210, and 212 may electronically set by the current drive into the VOA 206, 208, 210, and 212. Alternatively, a digital signal may be applied to each VOA 206, 208, 210, and 212 to obtain a pass-through optical switch that could be turned "on" or "off" by applying current to the electrodes.

This and other embodiments may be used to realize a monolithic integrated optical device that performs the function of separating the different wavelengths from an optical input, attenuating or switching each channel by a fixed or dynamically variable amount, and then combining the different wavelengths onto a single output. Alternatively, the monolithic optical device may be implemented as a standalone optical component or as a sub-component within an optical subsystem comprising additional components such as optical taps, detectors, and feedback control circuits. This embodiment may be used to perform dynamic spectral equalization, for example.

For example, the demultiplexer 204, the array of n fast VOAs or n fast switches 206, 208, 210, and 212, and the multiplexer 214 may be monolithically integrated onto an SOI platform (e.g., a BESOI platform or a SIMOX platform). Either or both the demultiplexer 204 and/or the multiplexer 214 may be realized as an optical waveguide device (e.g., an arrayed waveguide grating (AWG), a phased-array waveguide grating) on the same layer (e.g., 106) of the SOI platform as the n fast VOAs or n fast switches 206, 208, 210, and 212. The demultiplexer 204 may be coupled to the array of n fast VOAs or n fast switches 206, 208, 210, and 212 via waveguide elements 250, 252, 254, and 256, respectively, and the multiplexer 214 may be coupled to the array of n fast VOAs or n fast switches 206, 208, 210, and 212, and via waveguide elements 260, 262, 264, and 266, respectively.

Because the demultiplexer 204 and/or the multiplexer 214 are passive optical devices, the layer 106 need not be implanted with Au (or Pt). Hence, the top layer 106 in the SOI platform may be selectively implanted with Au (Pt) in the regions of the fast optical device (attenuator/switch), while leaving the regions of the passive optical device free from Au (or Pt). This embodiment may be used to realize a low-loss passive device.

Monolithic integration of the passive and active devices on the same SOI platform as described above is advantageous in that one can eliminate additional optical loss and expensive optical alignment between the demultiplexer 204 and/or the multiplexer 214 and the n fast VOAs or n fast switches 206, 208, 210, and 212. Furthermore, monolithic integration enables a compact form-factor optical device with the functionality and performance of an optical subsystem.

With emerging optical networks where optical wavelength channels are envisioned to be added or dropped dynamically, dynamic gain changes caused at least in part by the interplay between the large upper state lifetime of the erbium ions in an EDFA and the optical signal cause large gain fluctuations at the output of the EDFA when several channels are switched in or out of the EDFA. Such gain dynamics when multiplied over EDFA cascades cause lower signal-to-noise ratios (SNR) and severe system penalties for some or all of the channels.

FIG. 3 shows an example system 300 according to an embodiment of the present invention in which n VOAs 302, 304, 306, and 310 adjust the amplitude of n single channels (e.g., wavelengths $\lambda_0$, $\lambda_1$, $\lambda_1$, and $\lambda_n$) to provide uniform energy distribution across channels after amplification by n EDFAs 312, 314, 316, and 318 to a multiplexer 320 to realize a fast dynamic gain balanced system.

Figure 4:
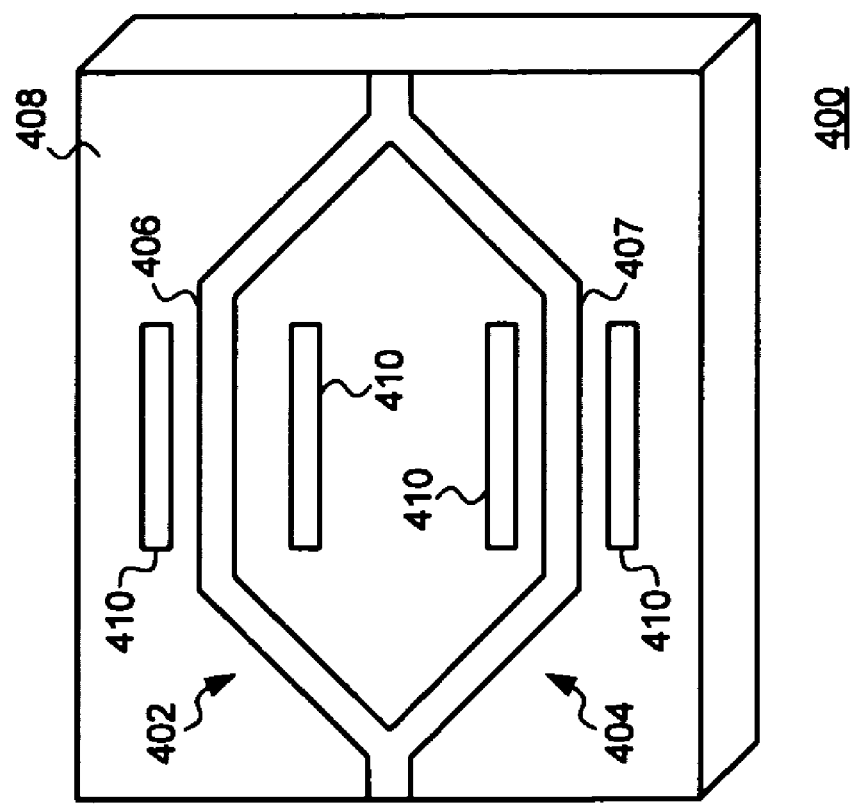

The optical device 100 may be a fast optical phase modulator implemented in a Mach-Zehnder interferometer to encode (i.e. "modulate") an optical carrier with electrical data. FIG. 4 illustrates an example fast optical modulator 400 according to an embodiment of the present invention. The fast optical modulator 400 may include two arms 402 and 404 each having a gold-doped waveguide 406 and 407, respectively, on an SOI substrate 408 according to embodiments of the present invention. The fast optical modulator 400 also includes contacts 410 to receive an electrical signal.

For purposes of explanation assume that the arm 402 is a reference arm, which has no phase shift, and that the arm 404 experiences phase shift. When a light beam is propagated through the fast optical modulator 400, interference occurs between the phase modulated and non-phase modulated portions of the light beam causing constructive and destructive interference in the light waves that propagate out of the fast optical modulator 400. Accordingly, this changes the amplitude of the light that passes through the fast optical modulator 400. The speed at which the amplitude of the light changes is based on the speed at which the carrier density in the waveguide 407 changes. Because the waveguide 407 is doped with Au, the amplitude of the light may be able to switch at speeds greater than about one hundred MHz up to about one GHz or more. This is because the Au (or Pt) dopant reduces the minority carrier lifetime of the waveguide 407 and the carrier density changes very rapidly, which enables very rapid amplitude modulation of the light passing through the example fast optical modulator 400.

According to an embodiment, the optical device 100 may be a fast optical switch implemented in a Mach-Zehnder interferometer. Switching occurs when the fast optical modulator 400 is turned "on" or "off."

Figure 5A:
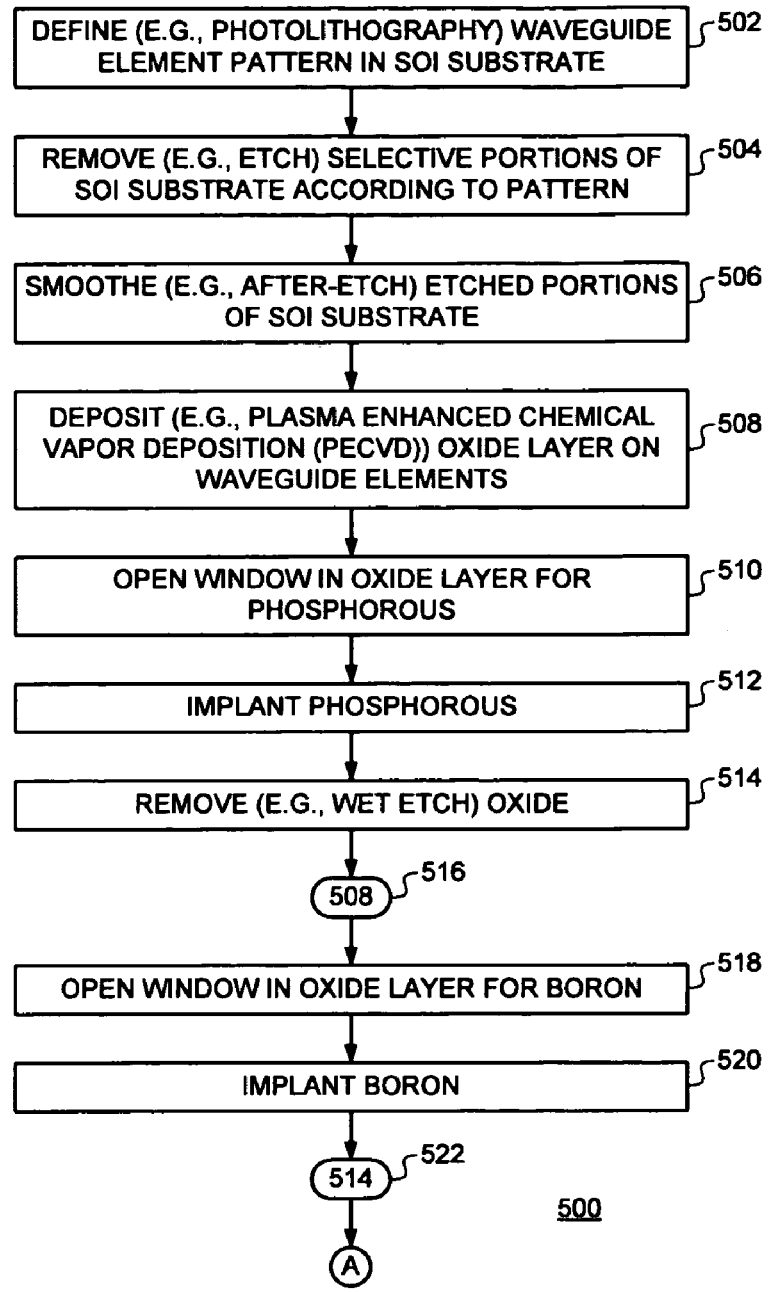
Figure 5B:
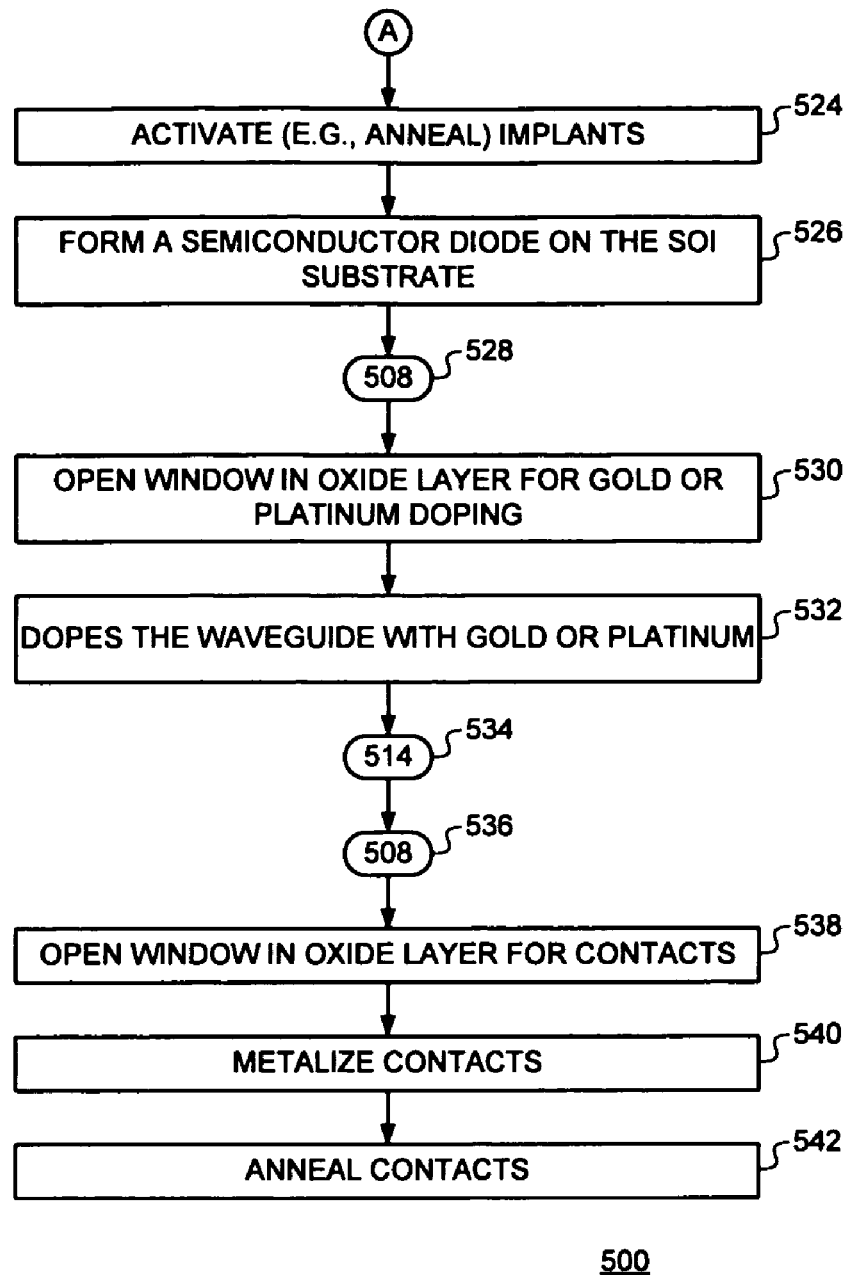

FIG. 5 is a flowchart illustrating a process 500 for making an optical device according to embodiments of the present invention. Of course, the process 500 is only an example process and other processes may be used.

A block 502, defines a waveguide element pattern in an SOI substrate, via any well-known or proprietary photolithographic technique, for example.

A block 504 removes selective portions of the SOI substrate (e.g., along portions of the pattern to form one or more waveguide elements), using well-known or proprietary reactive ion etching techniques, for example.

A block 506 smoothes the etched portions, using well known, or proprietary after-etching techniques, for example.

A block 508 deposits a layer of oxide in the waveguide elements of interest, using well known or proprietary plasma enhanced chemical vapor deposition (PECVD) techniques, for example.

A block 510 opens windows in the PECVD oxide layer for phosphorous implantation.

A block 512 implants phosphorous in the waveguide elements of interest via the windows opened for phosphorous implantation.

A block 514 wet etches the waveguide elements of interest to remove PECVD oxide.

A block 516 repeats operations performed in the block 508 (e.g., again deposits oxide in the waveguide elements of interest, using well-known or proprietary plasma enhanced chemical vapor deposition (PECVD) techniques, for example).

A block 518 opens windows in the PECVD oxide layer for boron implantation.

A block 520 implants boron in the waveguide elements of interest via the windows opened for boron implantation.

A block 522 repeats operations performed in the block 514 (e.g., wet etches the waveguide elements of interest to remove PECVD oxide).

A block 524 anneals the waveguide elements of interest to activate the boron and/or phosphorous implants.

A block 526 forms a semiconductor diode on the SOI substrate. According to embodiments of the present invention, the semiconductor diode is formed by doping portions of the SOI substrate with P-type material and N-type material in a well known manner using ion implantation, diffusion from spin-on solutions, or other current or future techniques.

A block 528 repeats operations performed in the block 508 (e.g., again deposits a layer of oxide in the waveguide elements of interest, using well known or proprietary plasma enhanced chemical vapor deposition (PECVD) techniques, for example).

A block 530 opens windows in the PECVD oxide layer for gold (Au) or platinum (Pt) doping.

A block 532 dopes the waveguide with gold (Au) or platinum (Pt). According to embodiments of the present invention, the waveguide element of interest is doped with gold (Au) or platinum (Pt) in a well known manner using ion implantation, diffusion from spin-on solutions, or other current or future techniques.

A block 534 wet etches the waveguide elements of interest to remove PECVD oxide.

A block 536 repeats operations performed in the block 508 (e.g., again deposits oxide in the waveguide elements of interest, using well-known or proprietary plasma enhanced chemical vapor deposition (PECVD) techniques, for example).

A block 538 opens windows in the PECVD oxide layer for contacts.

A block 540 metalizes the contacts in a well-known manner.

A block 542 anneals the contacts to form ohmic contacts, such as the anode 114 and the cathode 116.

Figure 6:
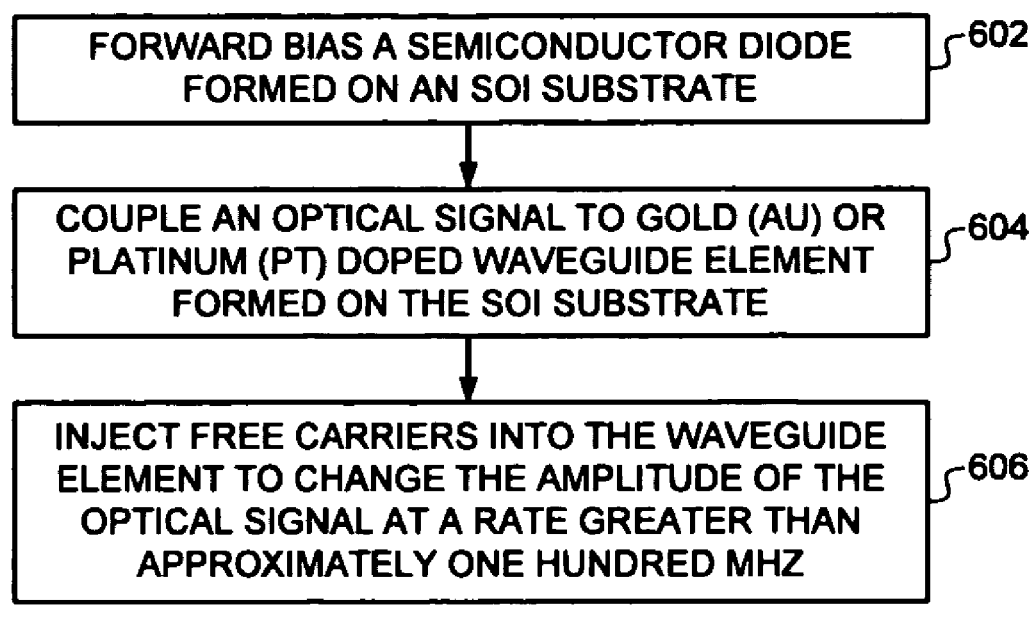

FIG. 6 is a flowchart of a method 600 of operating an optical device according to embodiments of the present invention.

A block 602 forward biases a semiconductor diode formed on an SOI substrate. In one embodiment, the semiconductor diode is forward biased by applying a positive potential to P-type material doped on the SOI substrate and by applying a negative potential to N-type material doped on the SOI substrate.

A block 604 couples an optical signal to a gold (Au) or platinum (Pt) doped waveguide element formed on the SOI substrate.

A block 606 injects free carriers into the waveguide element to change the amplitude of the optical signal propagating in the gold-doped waveguide element. In one embodiment, the rate of change in amplitude of the optical signal may be greater than approximately one hundred MHz.

Of course, the present invention is not limited to the embodiments illustrated herein. For example, the optical device 100 may be implemented in any voltage-controlled, carrier-injected optical device. Additionally, there may be one or more multiplexers, demultiplexers, optical amplifiers, and fast attenuators cascaded together, whose implementation will be readily understood from reading the description herein.

Embodiments of the invention can be implemented using hardware, software, or a combination of hardware and software. Such implementations include state machines and application specific integrated circuits (ASICs). In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a silicon-on-insulator (SOI) platform comprising:
      a first intrinsic silicon layer;
      an insulator layer disposed on the first intrinsic silicon layer; and
      a second intrinsic silicon layer disposed on the insulator layer;
   a semiconductor diode disposed on the SOI platform; and
   a Mach-Zehnder interferometer disposed on the SOI platform, the Mach-Zehnder interferometer having a first and second waveguide at least one of which is doped with gold (Au) atoms and/or platinum (Pt) atoms as impurities.

2. The apparatus of claim 1, wherein the SOI platform is bond-and-etchback-silicon-on-insulator (BESOI) substrate.

3. The apparatus of claim 1, wherein SOI platform is a separation by implanted oxygen (SIMOX) SOI substrate.

4. The apparatus of claim 1, further comprising electrical contacts disposed on the SOI platform.

5. A system, comprising:
   a demultiplexer coupled to an output of the optical amplifier; and a set of optical devices coupled to the demultiplexer, an individual optical device in the set of optical devices having a waveguide and a semiconductor diode disposed on a silicon-on-insulator (SOI) platform, wherein the waveguide which is doped with gold (Au) atoms and/or platinum (Pt) atoms as impurities.

6. The system of claim 5, further comprising a multiplexer coupled to the set of optical devices.

7. The system of claim 6, further comprising an optical amplifier coupled to the multiplexer.

8. The system of claim 5, wherein the SOI platform is bond-and-etchback-silicon-on-insulator (BESOI) substrate.

9. The system of claim 5, wherein the SOI platform is a separation by implanted oxygen (SIMOX) SOI substrate.

10. The system of claim 5, wherein the demultiplexer comprises an arrayed waveguide grating (AWG).

11. A method, comprising:
forward biasing a semiconductor diode disposed in or on a silicon-on-insulator (SOI) substrate;
coupling an optical signal to a gold-doped and/or platinum-doped waveguide element disposed in or on the SOI substrate;
injecting free carriers into the waveguide element to change the amplitude of the optical signal propagating in the gold-doped and/or platinum-doped waveguide element, a rate of change in amplitude of the optical signal being greater than approximately one hundred MHz.

12. The method of claim 11, wherein forward biasing the semiconductor diode comprises applying a positive potential to a P-doped region formed in or on the SOI substrate.

13. The method of claim 12, wherein forward biasing the semiconductor diode further comprises applying a negative potential to an N-doped region formed in or on the SOI substrate.

* * * * *